No. 699,353. Patented May 6, 1902.
B. VAN STEENBERGH.
APPARATUS FOR THE MANUFACTURE OF CARBURETED HYDROGEN GAS.
(Application filed Sept. 5, 1901.)
(No Model.) 4 Sheets—Sheet 1.
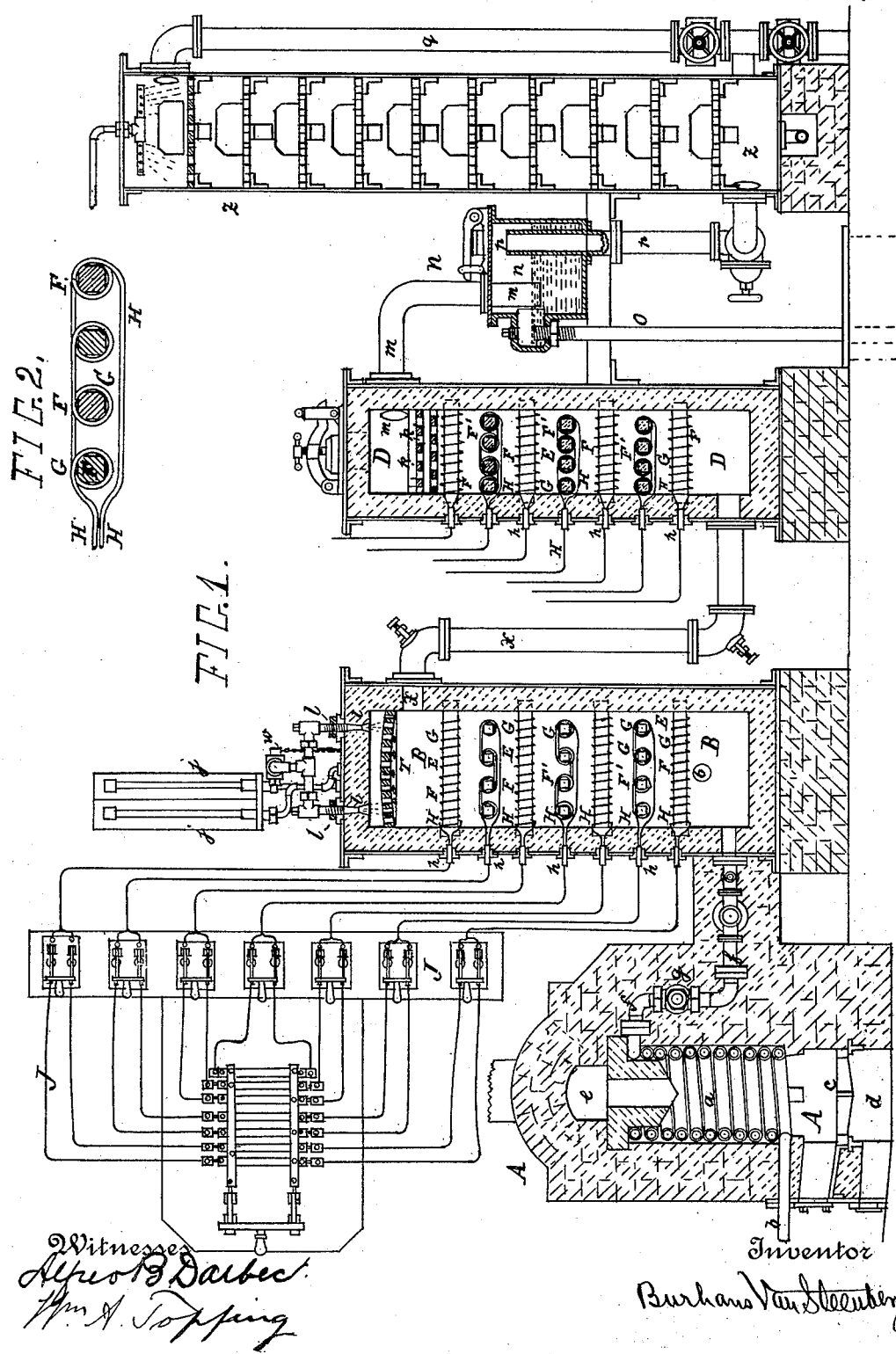

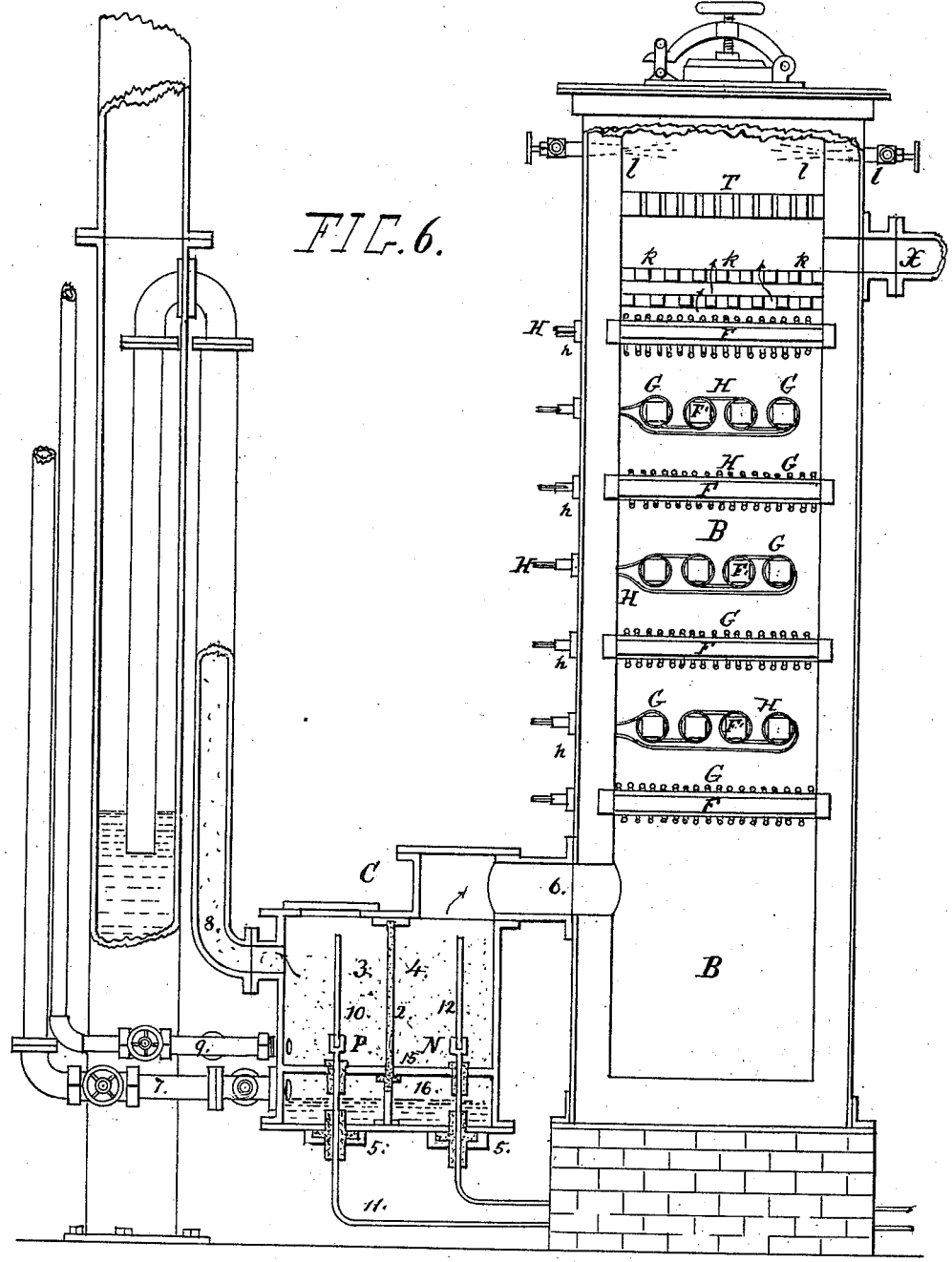

No. 699,353. Patented May 6, 1902.
B. VAN STEENBERGH.
APPARATUS FOR THE MANUFACTURE OF CARBURETED HYDROGEN GAS.
(Application filed Sept. 5, 1901.)
(No Model.) 4 Sheets—Sheet 4.

UNITED STATES PATENT OFFICE.

BURHANS VAN STEENBERGH, OF NEW YORK, N. Y.

APPARATUS FOR THE MANUFACTURE OF CARBURETED-HYDROGEN GAS.

SPECIFICATION forming part of Letters Patent No. 699,353, dated May 6, 1902.

Application filed September 5, 1901. Serial No. 74,445. (No model.)

*To all whom it may concern:*

Be it known that I, BURHANS VAN STEENBERGH, a citizen of the United States of America, residing at New York, State of New York, have invented certain new and useful Improvements in Apparatus for the Manufacture of Carbureting Hydrogen Gas, of which the following is a specification.

This invention relates to a water-gas apparatus to generate water-gas by a process such as described in a former application filed by me June 5, 1901, Serial No. 63,320.

The essential features of the invention in this application relate to the apparatus for generating water-gas by a process described and claimed in the application filed June 5, Serial No. 63,320, by me. Said features relate, first, to the combination comprising, with a generating-chamber provided with oil-supply nozzles and steam or hydrogen supply connection, suitable electric incandescent heaters for generating the water-gas, and relate, second, to a combination comprising a fixing-chamber connected with a generating-chamber and having tortuous passages heated by electric incandescent heaters for fixing the gases in said chamber, and relate, third, to a combination comprising said generating-chamber, its oil-nozzles, and electric incandescent heaters, said chamber being connected with a steam or water decomposing chamber to supply free hydrogen into said chamber, and finally relating, fourth, to a combination comprising said generating-chamber, its oil-nozzles and electric incandescent heaters, and a connected steam-superheater.

Other essential features are set forth in the following specification and claims.

Figure 3:
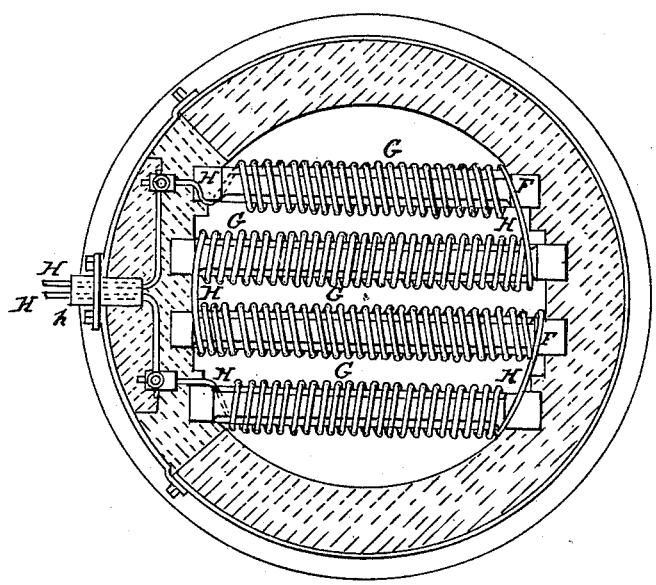
Figure 5:
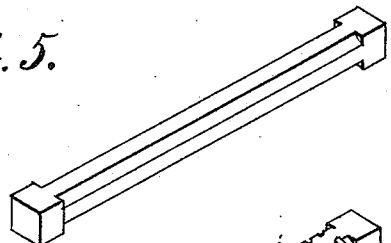
Figure 4:
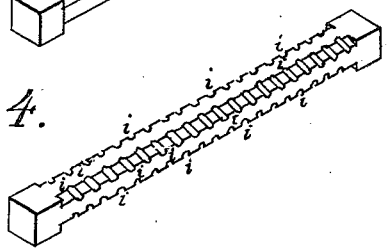
Figure 7:
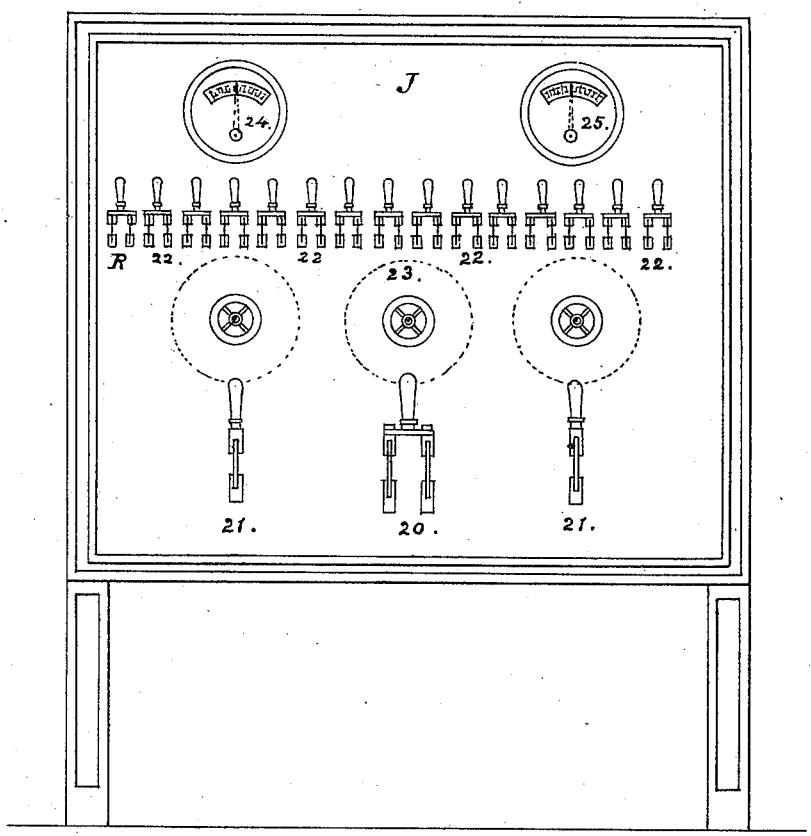

In the annexed drawings, Figure 1 represents a vertical sectional elevation of the apparatus constructed according to the invention, the line of section passing through the steam-superheater, and not showing the electric steam-decomposing chamber, which is shown in Fig. 6. Fig. 2 is a detached vertical cross-section of one row or set of the horizontal tiles and their electric heating-coils. Fig. 3 is a horizontal section of the generating-chamber and showing a top view of a complete set or row of tiles provided and carrying upon them the electric heating-coils. Fig. 4 is a detail perspective view of one of the tiles for carrying electric heating-coils. Fig. 5 is a detached perspective view of a modification of the said tile. Fig. 6 represents a sectional elevation of the apparatus, the plan of section taken through the electric decomposing-chamber of the water or steam. Fig. 7 represents an elevation of a single switchboard used for both the generating and fixing chambers.

The letter of reference A indicates a steam superheating-furnace having a steam-coil $a$ connecting with a suitable steam-boiler by its inlet-pipe $b$, and said coil $a$ is inclosed by a thick fire-brick wall, and under the coil $a$ is provided a grate $c$, and under the grate is provided an ash-pit $d$, and for access to the grate and ash-pit is built in the front wall for each a proper opening in the wall, furnished with a door for each. Upon the top of the coil is placed a strong clay cover having a vertical flue through it conducting the products of combustion into a suitable chimney or smoke-pipe. The outlet-pipe of the coil is furnished with a valve $g$ and is protected with asbestos or fire-brick walls over it and connects directly with the electric decomposing-chamber C, (shown in Fig. 6,) which connects with the chamber B by the pipe 6 to discharge the hydrogen gas set free from the steam into said chamber B. The generating-chamber B may be constructed cylindrical, as shown, or with a square cross-area and is made of a suitable dimension to generate the volume of gas required in a given time. The steam for the superheater may be supplied by any suitable steam-boiler through the pipe $b$, or the steam may be furnished direct to the decomposing-chamber C through the pipe 9 or be drawn from the pipe $f$ of the superheater by connection with the chamber C and furnished with a valve to stop the flow of steam into chamber B from the pipe $f$. The chamber C may be preferred to be connected and supplied separately from the superheater A with steam by the pipe 9 and with water by the pipe 7, as shown in Fig. 6.

D represents the fixing-chamber, which is of less diameter than the generating-chamber, and both chambers are constructed with an outer sheet-iron shell and top and bottom plate, and both are lined inside with fire-brick walls, and both are heated with incandescent heat by electricity, and each chamber for that purpose has series of horizontal rows E of longitudinal tiles F, arranged parallel and with an even distance apart and the rows arranged suitable at even distance and above one another. There are also horizontal lateral rows E of parallel tiles F' centrally between and above the aforesaid rows of longitudinal tiles F, as shown in Figs. 1 and 6. Said tiles F and F' each has its ends projecting into and bound in the opposite walls, for which purpose each tile may have square ends to engage in the walls, as shown in Figs. 4 and 5. The portion of each tile between the walls of the chamber may be formed round or square, but is preferred eight-cornered, as shown in Figs. 2, 4, and 5, of which the four opposite diagonal corners are of a larger radius and are formed or cut with grooves $i$, arranged in a spiral line circumscribing the aforesaid eight-cornered portion or central body of the tile, upon which portion of the tile is provided to carry the spiral coil G of wire, which is laid in said grooves $i$ to guide and hold it properly to the tile. For each row of tiles F and F' is employed one current with one electric conducting-wire H from the positive pole of the dynamo through a switch to the coils and from the coils back to a switch and from it back to the negative pole of said dynamo or electric generator. Said each wire H passes through a proper insulated plug $h$ or fixture into the side of the chamber and to the relative row E of tiles, with which said wire H is connected on the outer or first tile of the row and passes spirally over it forward, forming a spiral coil G over said tile. Near its end said wire passes over to the second or next tile, also forming a spiral coil G, again passing rearward, and now near the end of this tile passing over to the third tile of the row and forming a spiral coil G forward, and again near its end passes over to the fourth tile and forming a coil G rearward, at the end of which tile the wire H returns directly back to the plug $h$, through which it entered, and passes back to the same switch for return to the electric generator. The wire passing into the chamber is insulated from the wire passing out from the chamber.

Above the rows E of tiles F and F' and their coils G are provided with several layers of tiles in checker-brick order to form tortuous passages $k$ for the gas to pass and become fixed, as shown in chambers D and B, Figs. 6 and 1. A sufficient number of coils G and rows are employed to heat said chambers for successfully generating and fixing the water-gas.

There may be a separate switchboard employed for each chamber B and D, as shown in Fig. 1; but it is preferable to employ one switchboard for both chambers and also the electric water and steam decomposing chamber C, (shown in Figs. 1, 6, and 7,) in which the electric-main switch 20 is employed centrally near the base of the board for the operation of the main electric current of the generator. To each side of said switch is located a switch 21, of which one is employed for the currents of chamber B and the other for the currents of the chamber D, and above said switch is a long row of small switches 22, one for each current, passing to a row E of tiles and their coils G. One or more rheostats 23 are arranged between the switch 20 and the row of switches 22. Above the switches 22 is arranged to the left an ammeter 24 and to the right a voltmeter 25 to guide the operator in generating the power. A small switch R is employed for the currents supplying the anode and cathode in the steam and water decomposing chamber C, and said switch is arranged in the same row with the switches 22.

For vaporizing the oil a suitable oil-heater heated by steam is connected by a coiled-pipe system within a steam-tank, and connected with the top portion of the generating-chamber B and for the introduction of the oil-vapor into said chamber are employed several oil-nozzles $l$, either through the top of the generator, as shown in Fig. 1, or through the side, as shown in Fig. 6, and said connection from the oil-heater is furnished with a proper valve $w$ to regulate the flow of the oil into the chamber B, and said chamber is also furnished and connected with one or more gages $j$ to indicate the pressure in the chamber during the operation of generating the water-gas. Below the nozzles for injecting the oil-vapor in the top part of the chamber is constructed a horizontal perforated circular tile T for the distribution of the oil-vapor. (Shown in Figs. 1 and 6.)

The top space of the generating-chamber has a gas-outlet pipe X, connecting with the bottom space of the fixing-chamber D, and thereby delivering the product of gas from the generating-chamber to the fixing-chamber D, in which the gases rise and pass between the heating-coils and through the tortuous passages between the tiles. The top space of said chamber is furnished with the outlet and dip pipe $m$, delivering the gas in the hydraulic main or wash-box $n$ of the apparatus. Said wash-box has the vertical overflow-pipe $o$, which is made adjustable for the pressure of the gas-holder. A vertical pipe $p$, employed on the wash-box bottom, with an inlet from the top space of the wash-box and connecting with the bottom space of the scrubber $z$, provided for the delivery of the gas from the wash-box into the scrubber, in which the gas rises and passes through coke upon the trays provided, while a flow of sprinkling-water passes down over the gas and causes to condense the gas and to drop therefrom. By means of the pipe $q$, connected to the top space of the scrubber, the gas is delivered into the gas-inlet pipe of the gas-holder. The lower space of the chamber B is connected by pipe 6 with the electric steam and water decomposing chamber C. (Shown in Fig. 6.) Said chamber is divided by a vertical partition 2, and its lower part is divided by a horizontal partition 15, thereby providing a lower space 16 to contain water, if preferred, and the spaces above to contain steam. The partition 15 is perforated. The partition 2 may be porous or of asbestos, and thereby the upper space of the chamber C is divided into two compartments 3 and 4. In the compartment 3 is employed an electric connected anode 10 with the positive pole of the electric generator. In the compartment 4 is employed an electric connected cathode with the negative pole of the electric generator. The lower part of the partition 2 may have openings to communicate. By the electric current through the anode and water or steam the oxygen is eliminated very rapidly, which passes up through pipe 8, which may have its outlet sealed by water, as shown. The oxygen in breaking the seal is conducted by the pipe to a chimney or other suitable space, and by the electric current through the cathode 12 the water or steam, the hydrogen of the steam and water is set free and rapidly flows through pipe 6 into the generating-chamber and passes into oil-vapors, becoming carbureted, and passes through the tortuous high-heated passages in the fixing-chamber, by which the product is fixed carbureted hydrogen gas. By the electric incandescent heated wire-coils G the chambers B and D are heated without the use of coal, and therefore without largely introducing sulfuric and oxygen compounds and without blast periods during the process, thereby providing a continuous-operating gas process and delivering the product in a largely-purified state at a reduced cost.

The construction of the electric incandescent heaters may be modified. Instead of placing the said coils G horizontally into the chamber they may be preferred to be placed or suspended vertically and the ends of each coil secured to projecting tiles on the walls of the chamber.

What I claim, and desire to secure by Letters Patent, is—

1. In an apparatus for generating illuminating-gas, the combination comprising a generating-chamber, oil-nozzles and electric incandescent heaters, a connected steam-superheater and a connected electric steam or water decomposing chamber substantially as and for the purpose herein set forth.

2. In an apparatus for generating water-gas the combination of the generating-chamber, the fixing-chamber, steam-decomposing chamber, the hydraulic seal and scrubber and the generating-chamber provided with oil-nozzles, the fixing-chamber with tortuous passages and both chambers provided with electric incandescent heaters, substantially as and for the purpose herein set forth.

3. In an apparatus for generating gas the combination comprising the generating-chamber, the fixing-chamber the electric water or steam decomposing chamber; said generating and fixing chamber provided with electric incandescent heaters, and said decomposing-chamber provided to deliver free hydrogen into the generating-chamber, and provided to conduct the oxygen to a storage-holder substantially as and for the purpose herein set forth.

In testimony whereof I, BURHANS VAN STEENBERGH, have signed my name to this specification in the presence of two subscribing witnesses.

BURHANS VAN STEENBERGH.

Witnesses:
ALFRED B. DALBEC,
WM. A. TOPPING.